Oct. 13, 1925.  
F. A. LUNDQUIST ET AL  
1,556,942  
SWITCHING MECHANISM  
Original Filed April 25, 1921  5 Sheets-Sheet 1
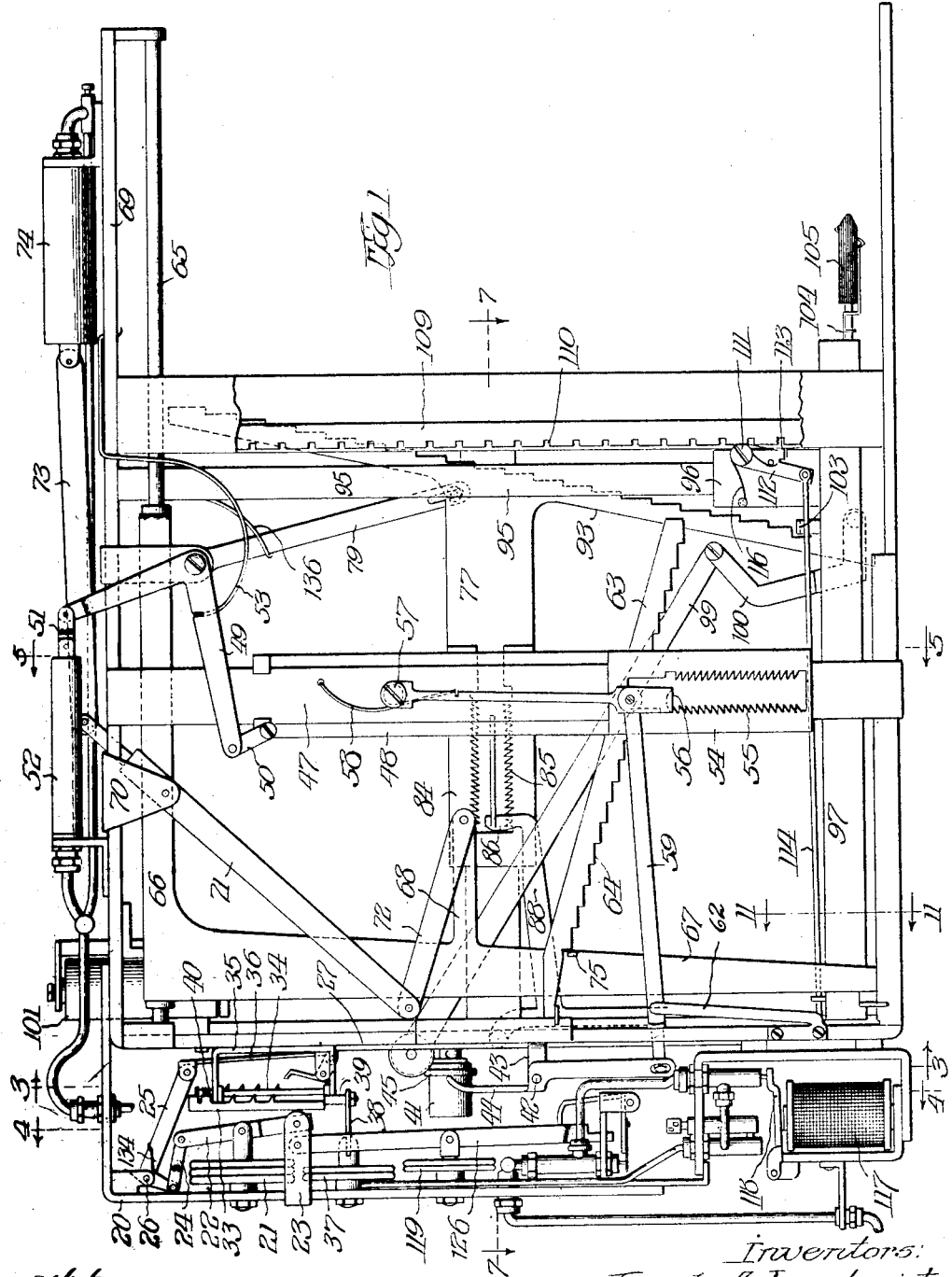

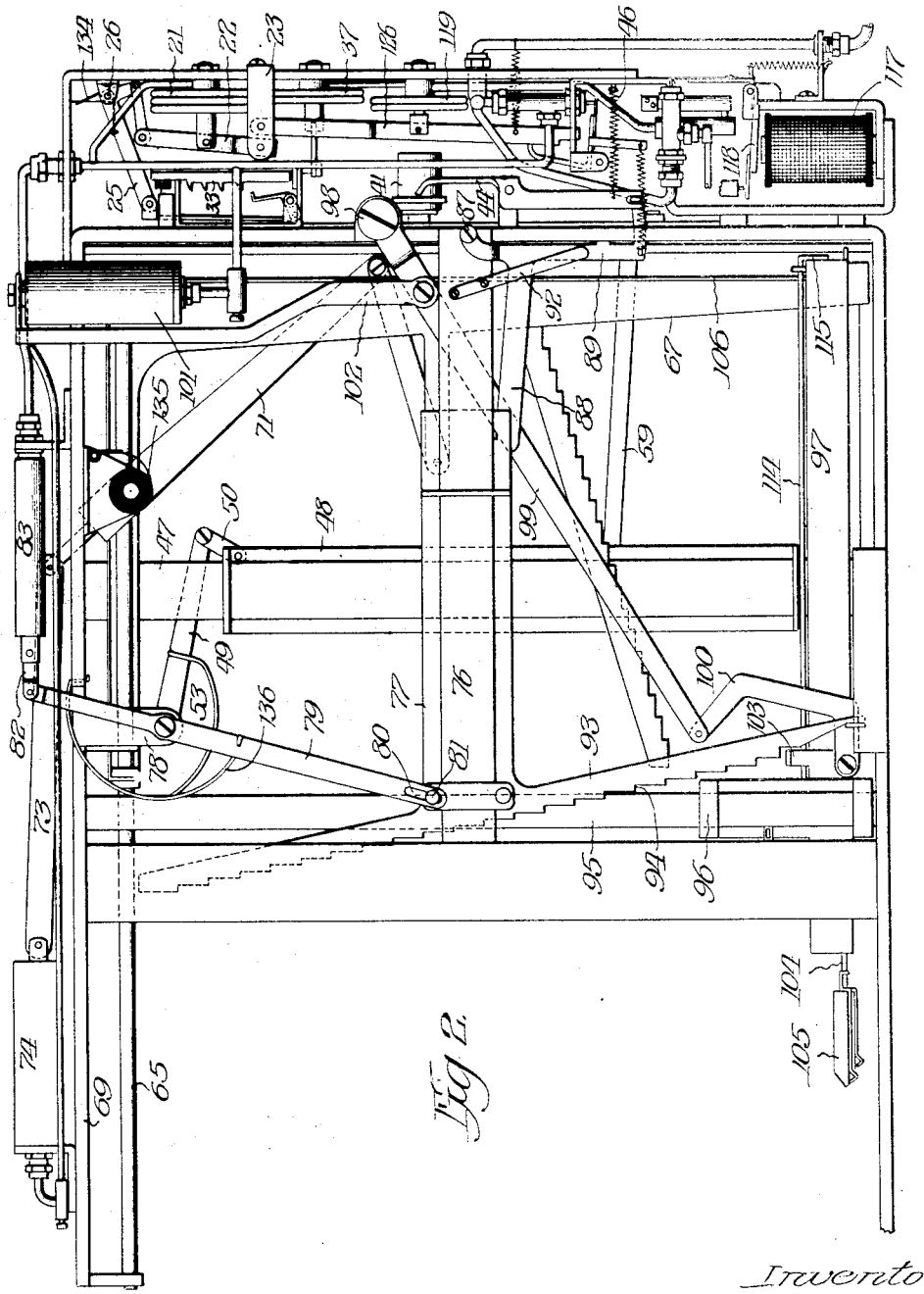

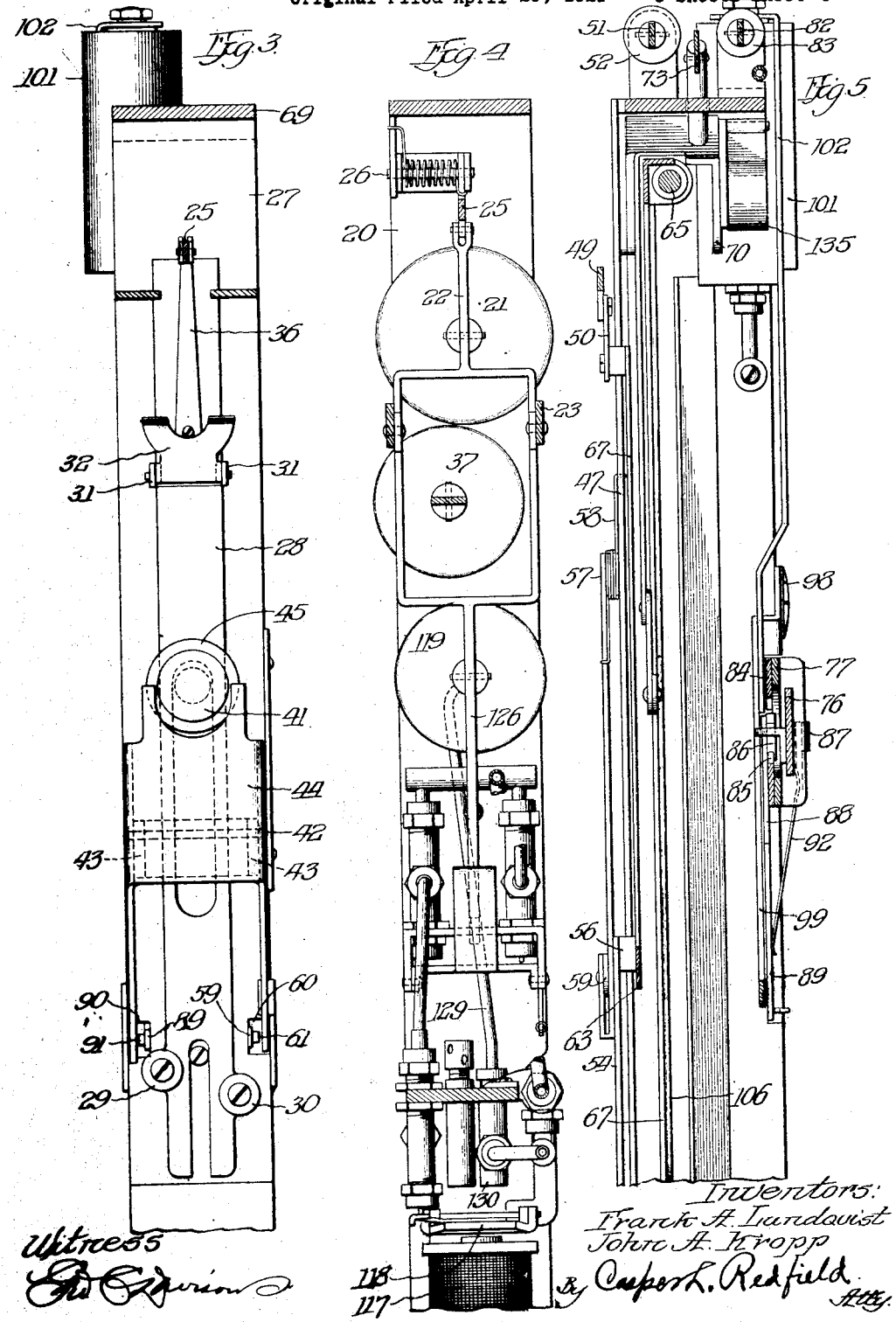

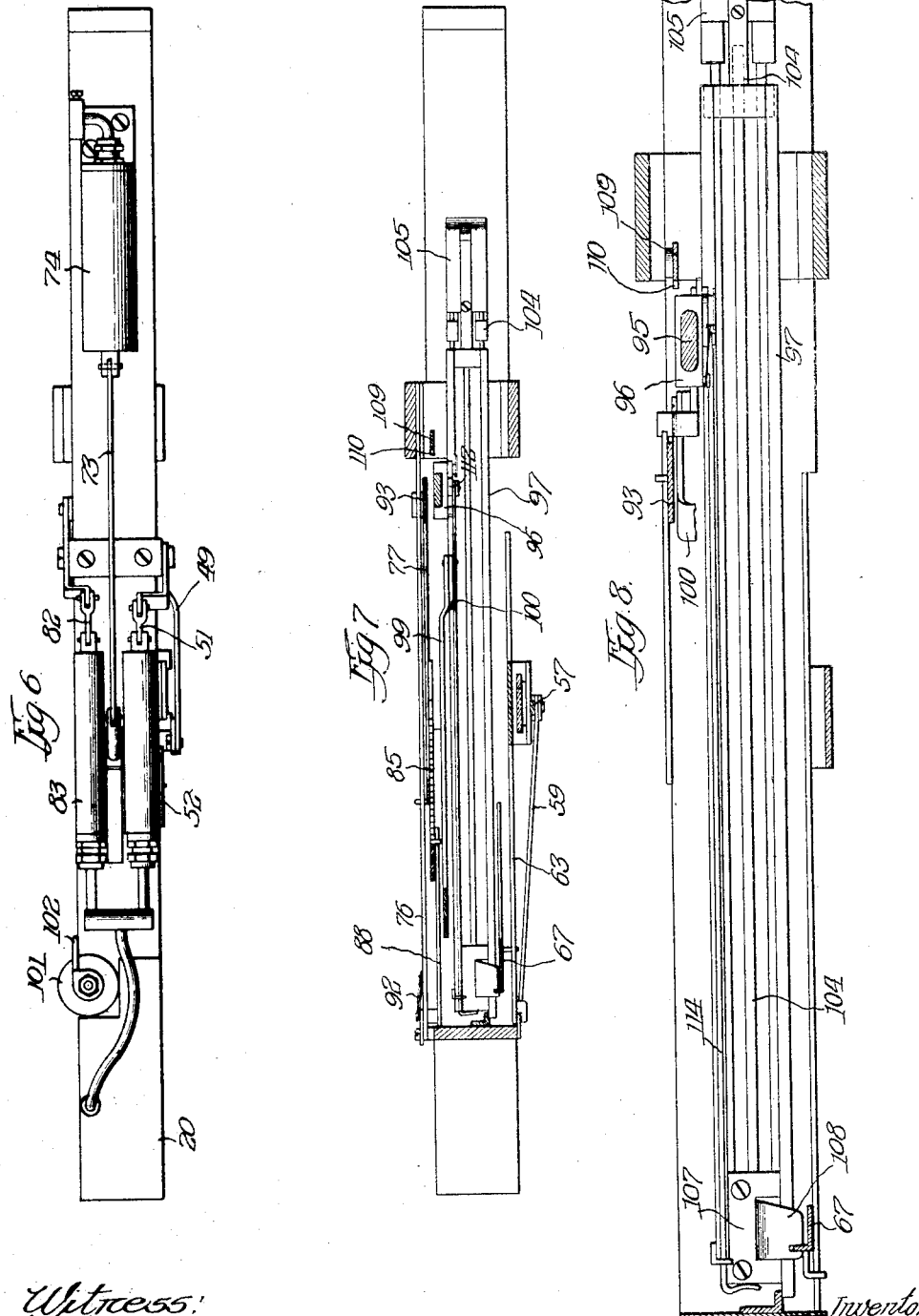

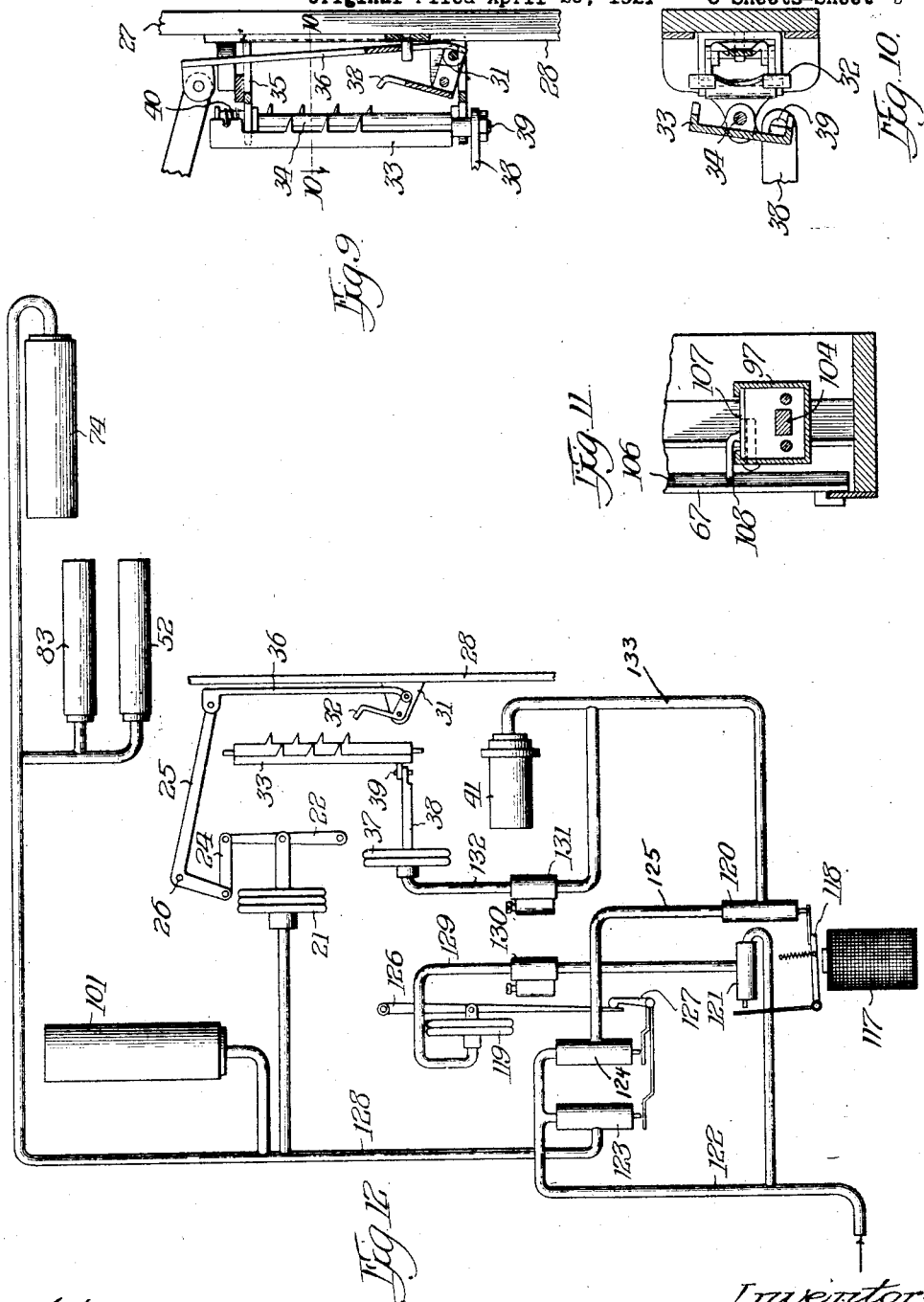

Patented Oct. 13, 1925.

1,556,942

UNITED STATES PATENT OFFICE.

FRANK A. LUNDQUIST AND JOHN A. KROPP, OF CHICAGO, ILLINOIS, ASSIGNORS, BY MESNE ASSIGNMENTS, TO HENRY S. CONRAD, TRUSTEE.

SWITCHING MECHANISM.

Application filed April 25, 1921, Serial No. 464,218. Renewed March 19, 1925.

*To all whom it may concern:*

Be it known that we, FRANK A. LUNDQUIST and JOHN A. KROPP, citizens of the United States of America, and residents of Chicago, county of Cook, and State of Illinois, have invented certain new and useful Improvements in Switching Mechanisms, of which the following is a specification.

Our invention relates to switching mechanisms for automatic telephone exchanges, and has for its object, improvements in such devices.

In the accompanying drawings—

Fig. 1 is an elevation of the right-hand side of the mechanism;

Fig. 2 is an elevation of the left-hand side;

Figs. 3, 4 and 5 are vertical sections on lines 3—3, 4—4 and 5—5; respectively, of Fig. 1;

Fig. 6 is a plan;

Fig. 7 is a section on line 7—7 of Fig. 1;

Fig. 8 in an enlarged plan of the lower parts, some of the parts above being in horizontal section;

Fig. 9 is an enlarged detail of some of the parts shown in the upper left-hand part of Fig. 1;

Fig. 10 is a section on line 10—10 of Fig. 9;

Fig. 11 is a partial section on line 11—11 of Fig. 1; and

Fig. 12 is a diagram.

The present mechanism is mounted in a rectangular frame work, and is arranged to move contact makers first in one direction, and then in a direction perpendicular thereto, so as to bring them into engagement with stationary contacts. As the present invention is confined to the moving operations and devices therefor, the stationary contacts are not shown, and the movable ones are merely indicated.

The operations are effected by pneumatic motors controlled by a magnet and certain valves. Two forms of motors are used. One form consists of a cap arranged to reciprocate on a stationary tubular member. The cap is moved from normal position by air pressure, and is returned by spring or gravity. This form of motor is described in detail in Lundquist's pending application, Serial Number 248,104, filed August 3, 1918, and in other pending applications, and need not be described in detail here as it is not a part of the present invention. The other form of motor is a diaphragm, simple or compound, and is known in the trade as a sylphon.

In the pipes leading to these motors are valves which normally prevent compressed air reaching the motors when the valves are closed. The interior part of each valve has a projecting stem which, when pushed inward, opens the valve to permit air to flow to the adjacent motor. These valves and the sylphons have been described in detail in Lundquist's pending application Serial Number 328,078, filed October 2, 1919.

Secured to the inner face of the front part or member 20 of the frame is a sylphon 21 which acts on a lever 22 pivoted on a bracket 23 on the part 20. A link 24 connects the lever 22 to the short arm of a bellcrank lever 25 pivoted at 26.

Parallel with the front member 20, and near to it, is another member 27 of the frame work, and on this member is a slide 28 having rollers 29 and 30 on its lower portions. On the upper part of slide 28 are lugs 31 to which is pivoted a double toothed pawl 32 arranged to engage teeth cut on opposite flanges of a channel 33 pivoted on a rod 34 which is carried in a bracket 35 on member 27. A link 36 connects the tail of the pawl 32 with the long arm of bellcrank lever 25.

When compressed air is admitted to the sylphon 21, the said sylphon expands and raises the long arm of bellcrank 25. The first part of this movement causes the pawl 32 to turn on its pivot until it engages one flange of channel 33 beneath a tooth thereon. When this occurs, the further movement of the bellcrank 25 acts to raise the slide 28 until stopped by engagement between the pawl and a tooth on channel 33.

Adjacent to the sylphon 21 is another sylphon 37, connected by link 38 to a pin 39 on channel 33. An expansion of sylphon 37 turns channel 33 on its pivot so as to release the engaged tooth on one flange thereon from the pawl 32, and bring a tooth on the opposite flange in line with the pawl. This permits sylphon 21, acting thru lever 25 and link 36, to raise the slide 28 a short distance. When air is exhausted from sylphon 37, spring 40 on rod 34 returns channel 33 to normal position. This shifts the pawl connection from one flange of the channel to the other, and permits a further rise of slide 28 under action of sylphon 21. These parts constitute an escapement in which an expansion and subsequent contraction of sylphon 37 permits the slide 28 to rise a distance equal to that between one tooth and the next adjacent one.

Mounted on the member 27 is a small motor, the movable cap of which is represented at 41. Pivoted at 42 on a bracket 43 secured to member 27, is a lever 44, the upper end of which bears against a collar 45 on motor 41. The lower end of lever 44 is in the form of two arms having slots in the lower ends thereof. Connecting to one of these arms is a retracting spring 46 (Fig. 2) which serves to retract the motor 41 after it has been moved by the admission of air.

Extending vertically on one side of the frame is a bar 47 which serves as a guide for a slide 48. The upper part of the slide 48 is connected, thru bellcrank 49 and links 50 and 51, with a motor 52 mounted on the top 69 of the frame work. When air is admitted to the motor 52 it puts an upward strain upon the slide 48. A spring 53 acts to normally depress the slide.

Secured to the lower part of the slide 48 is a plate 54 having teeth 55 cut in opposite edges of a slot in said plate, and located in this slot is a pawl 56 pivoted at 57 on bar 47. A spring 58 normally holds the pawl 56 at the position shown in Fig. 1. Secured to the pawl 56 is a link 59 which extends thru a slot 60 in the member 27, and has on its end a pin 61 which is located opposite the slot in the adjacent lower arm of lever 44. A spring 62 normally holds the link 59 so that pin 61 will be clear of said slot, but when the slide 28 rises the proper distance, the roller 30 engages the link to move it laterally against the action of spring 62 and cause pin 61 to enter the slot in lever 44. If the motor 41 reciprocates when the parts are in this condition, the pawl 56 and teeth 55 will operate as an escapement to permit slide 48 to rise step by step.

Secured to the slide 48 is a diagonal bar 63 having thereon steps 64, the vertical rise of which equal the vertictl distance between one tooth 55 and the next adjacent one.

In the upper part of the frame work is a horizontal rod 65 which serves as a guide for a slide 66. The slide 66 has a depending leg 67 on which is a lug 68. Secured on the upper member 69 of the frame work is a bracket 70 on which is a lever 71. Links 72 and 73 connect opposite ends of lever 71 to lug 68 and to a motor 74 on the top of the frame work. On the leg 67 is a pin 75 arranged to engage the steps 64 on bar 63. If compressed air is admitted motor 74 at a time when the slide 48 is rising, the slide 66 will be moved to the right as shown in Fig. 1 until stopped by the pin 75 engaging a step 64. What particular step is thus engaged will depend upon how far the escapement 55—56 has permitted the slide 48 to rise.

Extending transversely across the frame is a bar 76 (Fig. 2) which serves as a guide for a slide 77. On the top frame member 69 is a bracket 78, and on this is pivoted a lever 79, having in its lower end a slot 80 which engages a pin 81 on slide 77. The upper end of lever 79 is connected thru link 82 with a motor 83 on the top of the frame. Compressed air admitted to motor 83 puts a tension on slide 77 to move it laterally.

Secured to the slide 77 is a plate 84 having teeth 85 cut in opposite edges of a slot in said plate, and located in this slot is a pawl 86 pivoted at 87 on bar 76. The arm 88 which connects pawl 86 to its pivot 87 has a downward projection 89 which extends thru a slot 90 in the member 27, and has on its end a pin 91 which is located opposite the slot in the adjacent lower arm of lever 44. A spring 92 normally holds the projection 89 so that pin 91 will be clear of said slot, but when the slide 28 rises the proper distance, the roller 29 engages the projection to move it laterally against the action of spring 92 and cause pin 91 to enter the slot in lever 44. If the motor 41 reciprocates when the parts are in this condition, the pawl 86 and teeth 85 will operate as an escapement to permit the slide 77 to move laterally step by step under the action of motor 88.

On the slide 77 is a diagonal bar 93 having thereon steps 94, the horizontal distance of which is equal to the horizontal distance between one tooth 85 and the next adjacent one.

Near one end of the frame is a vertical guide bar 95, and on this is a slide 96 connected to a horizontal channel 97. Pivoted at 98 on the frame is a lever 99 which has its outer end connected to the slide 96 by means of a link 100. Secured in the upper part of the frame is a motor 101 which is connected to lever 99 by a rod or link 102. When compressed air is admitted to the motor 101 it puts a strain on carriage 96 to move it upward. Such upward movement is stopped by a lug 103 on the carriage 96 engaging one or another of steps 94 on bar 93.

Within the channel 97 is a slide 104, on the outer end of which is a head 105 provided with contact makers designed to engage stationary contacts. These contact makers may be of any form to match the stationary contacts used. All that we are interested in at the present time is the means of moving the head 105 to a desired position.

On the inner face of the vertical leg 67 of the slide 66 is a flange 106, and secured to the slide 104 by means of a block 107, is a fork 108 which embraces the flange 106. These parts are so arranged that when the channel 97 is moved with respect to the leg 67, the fork 108 slides on the flange 106; and when the leg 67 is moved with respect to the channel 97, the slide 104 is moved in the channel 97.

Adjacent to the vertical guide 95 is a bar 109 which has in it a series of notches 110, the spacing of which corresponds to the steps 94 on the adjacent bar 93. Pivoted at 111 on the slide 96 is a lever 112 having a dog 113 adapted to engage one or another of the notches 110 in bar 109. Connected to the lever 112 is a rod 114 which extends to the other end of channel 97 and has a bent over end 115 engaged by the block 107. When the slide 104 is in its normal position, the block 107 engages the end 115 and holds the dog 113 from the notches 110, but when the slide 104 moves from normal position, the block 107 leaves the end 115 and a spring 116 acts to move lever 112 so as to throw the dog 113 into the notch 110 adjacent to which it is at the time.

In addition to the parts so far described there are a magnet 117 with its armature 118, a sylphon 119 with connections, air pipes, certain check valves which permit a free flow of air in one direction and a restricted flow in the opposite direction. Also there are certain minor mechanical parts, retracting springs, and other items. All of these will be either self evident or will receive description in connection with the description of the operation.

This apparatus is controlled by impulses flowing to the magnet 117. The impulses which come to this magnet are the same as those which come to a corresponding magnet in ordinary automatic telephone exchanges and need not be set forth in detail. Normally there is no current flowing thru this magnet.

The first step in operating this apparatus is closing the circuit thru magnet 117 which results in attracting the armature 118. In the normal position of the armature 118 the valve 120 is open and the valve 121 is closed. The main supply pipe 122 leads to valve 121 and to the valves 123 and 124, which latter are simply duplicates which might be one valve but are made as two for convenience of manufacture. The air supply for valve 120 comes thru valve 124 and pipe 125, but as valve 124 is normally closed the normally open condition of valve 120 is immaterial.

The attraction of armature 118 opens valve 121 and permits valve 120 to close. This permits compressed air to flow from the source thru pipe 129 to sylphon 119 which expands and opens valves 123 and 124 thru the action of the intermediate levers 126 and 127. The opening of valve 124 extends the source of air pressure to valve 120, but as this was closed by the previous attraction of the armature 118, nothing happens at this point. The opening of valve 123 admits air pressure to pipe 128 and hence to the motors 21, 52, 83, 74 and 101, which motors put a strain on the parts to be moved by them.

In pipe 129 is a check valve 130 provided with a by-pass and an adjusting screw. This check valve permits air to flow quickly thru pipe 129 to sylphon 119, but the screw in the by-pass retards the return flow so that the sylphon will not be deflated by the closure of the valve 121 for a short interval. A similar check valve 131 in pipe 132 permits air to flow quickly to sylphon 37 but prevents a rapid exhaust therefrom. The sylphons 37 and 119 are holding motors which remain expanded when rapid air pulsations occur in the pipe leading to them, but which become deflated when the pulsations cease and air is cut from those pipes.

The next steps in the operation come as a result of sending a series of electrical impulses thru magnet 117, said series terminating in a closed circuit thru the magnet. These impulses vibrate the armature 118 and cause a rapid opening and closing of the valves 120 and 121. The temporary closing and quick reopening of the valve 121 does not affect sylphon 119 because of the device 130, and said sylphon remains expanded during this operation. But in pipe 133 leading to motor 41 there is no such device, and said motor responds by as many reciprocations as there are impulses in pipe 133. In branch pipe 132 leading to sylphon 37 is the check 131, and as a consequence of this the sylphon 37 becomes expanded upon the first impulse flowing in this pipe and remains expanded as long as the impulses continue.

As previously described, the expansion of sylphon 21 throws pawl 32 into engagement with channel 33, and gives a slight preliminary movement of slide 28, which movement is stopped by the pawl engaging a tooth on the channel 33. When the first impulse flows in pipe 133, the sylphon 37 turns channel 33 to permit slide 28 to rise a half step under the action of sylphon 21. This upward movement of slide 28 brings the roller 29 into engagement with the projection 89 so as to force the pin 91 into the adjacent slot in the lower part of lever 44. As this occurs, the motor 41 begins its series of reciprocations which vibrate the lever 44 and consequently the arm 88 to reciprocate the pawl 86 between the teeth 85 on plate 84 of slide 77. As this slide is at this time under strain from the motor 83, the said slide is moved a distance which corresponds to the number of air pulsations sent to the motor 41.

The movement of the slide 77 correspondingly moves the attached bar 93 and removes the adjacent step 94 from over the lug 103 on the channel 97. As this channel is at this time under strain from motor 101 to raise it, the said channel will rise as many steps on the bar 93 as the motor 41 has given full reciprocations to the escapement 85—86, and will come to rest with lug 103 in contact with one of the steps 94.

One of the things to be noted in this connection is that the channel 97 with its connected parts are rather large and heavy, and that it is desired to move them upward thru several comparatively long steps as is indicated at 94. The primary operations are step by step reciprocations which it is desired should be made quickly. It is easy to reciprocate a light part quickly thru a short distance, but it is difficult to move heavy parts quickly thru long steps, there being a pause at the end of each step. In this case the motor 41 gives quick reciprocations to a light pawl 86 which has only a very short distance to move. At the same time the motor 83 pulls on the slide 77, and the said slide is moved short steps with comparative ease. Also at the same time the motor 101 pulls upward on the channel 97 and associated parts. As these parts are relatively heavy, their movement is not stated quite so quickly as is the movement of slide 77. On the other hand, the movement of the heavy parts is not divided into steps, but is continuous, with the result that they reach their final destination at nearly the same time as do the light parts moved by motor 83.

When the first series of impulses terminate, the armature 118 stands in an attracted position. This leaves valve 120 closed with the result that air is exhausted from sylphon 37 and the channel 33 moves so that sylphon 21 may raise slide 28 a small fraction of a step.

When the second series of impulses are sent thru the magnet 117, the sylphon 37 is again expanded and the slide 28 rises and completes the full step under the action of sylphon 21. This final movement upward of slide 28 moves roller 29 away from projection 89 so that pin 91 becomes freed from lever 44, and moves roller 30 into engagement with 59 so as to force pin 61 into engagement with lever 44.

The second series of impulses cause reciprocations of the motor 41, as did the first series, but this time those reciprocations reappear as reciprocations of pawl 56 between teeth 55. As the slide 48 is at this time under upward tension by reason of air pressure being on motor 52, the said slide rises as the escapement 55—56 operates. This upward movement of the slide removes the stepped bar 63 from pin 75, and permits motor 74 to move slide 66 to the right as seen in Fig. 1. When the channel 97 was moved upward as before described, the fork 108 on slide 104 moved up the flange 106 on leg 67 of slide 66. Consequently, the movement of the slide 66 just described results in moving the head 105 at some predetermined level above the one shown in the drawing. What level this is to be is determined by the number of impulses sent in the first series, and the distance the head is moved on this level is determined by the number of impulses in the second series.

When the slide 66 moves slide 104, the block 107 leaves the end 115 of rod 114, and spring 116 forces dog 113 into the adjacent notch 110. At the termination of the second series of impulses current remains standing on magnet 117, and the air supply is cut from pipe 133. This permits sylphon 37 to contract and turn channel 33, with the result that sylphon 21 raises the slide 28 far enough to make the roller 30 clear the link 59 in the same manner as before.

If the magnet 117 should be operated again, the channel 33 would be again vibrated and bar 28 would be advanced another step. The channel 33 is shown with teeth for such further operation; but as the matter involved in such operation is not a part of the present invention such operation is not herein described.

When the circuit is permanently broken thru magnet 117, the armature 118 falls back with the result that valve 120 is left open and valve 121 is left closed. The closing of valve 121 cuts the air supply from sylphon 119 which contracts and permits valves 123 and 124 to close. The closure of valve 123 cuts the air supply from motors 21, 52, 74, 83 and 101, and these fall back as will be described.

The closure of valve 124 cuts off the air supply from valve 120 so that the opening of that valve by the retraction of the armature is without effect. If, however, the steps in shutting off the supply of air to valve 120 is not quick enough to prevent a reciprocation of motor 41, such reciprocation would be of no consequence as at this time the lever 44 is free from pins 61 and 91.

When the air supply is cut from sylphon 21, the slide 28 falls back by gravity, as there is nothing to support it. A retracting spring 134 is, however, connected to lever 25 to cause the return to be prompt.

When the air supply is cut from motor 74, a retracting spring 135 on the pivot for lever 71 causes the slide 66 to return to normal position, in which action it withdraws the head 105 from the position to which it had been advanced. When slide 66 and head 105 reach normal position, the block 107 on slide 104 strikes the end 115 of rod 114 and withdraws the dog 113 from the notch 110 with which it was engaged. This unlocks the slide 96 and channel 97 allowing both to fall back by gravity to their normal position because they no longer have any supports. In this connection it should be noted that the channel 97 does not fall as soon as air is cut from motor 101, but falls only when it is unlocked by the slide 104 reaching normal position.

The downward movement of channel 97 removes the lug 103 from the notches 94 in bar 93 and permits a retracting spring 136 on lever 79 to return slide 77 to normal position.

Returning now to return movement of slide 66 to its normal position, it will be seen that the pin 75 on the leg 67 of slide 66 leaves the notches 64 of bar 63 and permits that bar and slide 48 to fall to normal position.

When all of these things have occurred as described, all parts are at the normal position from which they were started by the impulses sent thru magnet 117.

What we claim is:

1. The combination with a heavy body, and a motor for moving it a distance corresponding to a plurality of long steps, of a lighter body having thereon steps of the length which the heavy body is to move, and means for giving the lighter body a series of short steps, said parts being so arranged that the movement of the heavier body will be arrested when it comes into engagement with said lighter body at which time it has been moved over the space of as many long steps as the lighter body was given short steps.

2. In a switching mechanism. a bar having steps, said steps having faces thereon which are long in one direction and short in the direction perpendicular thereto, a heavy body arranged to be moved in a direction parallel to the long faces of said steps and to be arrested by engagement with any one of the short faces of said steps, a motor for so moving said body, and means for giving said bar a series of rapid movements of a length and direction corresponding to the short faces of said steps.

3. In a switching mechanism, a body and pneumatic means for giving it a step by step forward movement, a second body under tension to be moved in a direction perpendicular to the movement of said first body but restrained from such movement, and means by which upon the first body being moved the second body will be released and then arrested at the termination of a movement which is a multiple of the number of steps given to the first body.

4. The combination with a body arranged to be moved thru a long distance, a motor for so moving it, and a device for arresting such movement at any one of a plurality of points in such long distance, of means for moving said device step by step in a direction perpendicular to the movement of said body.

5. The combination with contact makers, and devices for moving them successively in directions perpendicular to each other, of controlling devices moved step by step to control the operations of the moving devices, and means by which the step by step movements of the controlling devices determine the distance that the moving devices are to be moved in said direction.

6. In a switching mechanism, a stepped bar, a carriage under tension to be moved but normally restrained by said bar, and a pneumatic motor for giving said bar a series of short movements to cause the release and subsequently the arrest of said carriage.

7. In a switching mechanism, a stepped bar under tension to be moved, an escapement normally restraining such movement, a carriage under tension to be moved but restrained by said bar, and a pneumatic motor for operating said escapement to permit movement of said bar, such movement of said bar serving to permit corresponding movement of said carriage.

8. In a switching mechanism, a short step escapement, a long step escapement, and means by which a plurality of operations of the short step escapement permits a corresponding operation of the long step escapement.

9. In a switching mechanism, two escapements, pneumatic means for applying tension to said escapements, a pneumatic motor arranged to cause one of said escapements to make a predetermined number of movements, and means by which such movements of one escapement permit corresponding movements of the other escapement.

10. Two pairs of escapements, one escapement of each pair serving to control the operations of the other of the pair, pneumatic means for putting tension on all of said escapements, a motor for operating the first escapement of each pair, and a second motor for shifting the first motor from one escapement to the other.

11. In a telephone system, an automatic switch having wipers for completing telephonic connections, said switch having two pairs of escapements, one escapement of each pair serving to control the operations of the other of the pair, means for putting tension on all of said escapements, a motor for operating the first escapement of each pair, and a second motor for shifting the first motor from one escapement to the other, said second motor thereby causing the wipers to be moved in different directions.

12. In a telephone system an automatic switch having wipers for completing telephonic connections, said switch having two pairs of escapements and a third escapement, means for putting tension on all of said escapements, means for operating the third of said escapements to cause the successive operation of the first and second pairs of escapements, and means for operating the first and second pairs of escapements for controlling the movement of the wipers.

13. In a telephone system, an automatic switch having wipers for completing telephonic connections, said switch having two pairs of escapements, one escapement of each pair serving to control the operations of the other of the pair, means for applying tension to said escapements, a motor for operating the first escapement of one pair to allow the wipers to be moved in one direction, a second motor for shifting the first mentioned motor from one escapement to the other to cause the successive operation thereof, and said first motor operating said other escapement to allow the wipers to be moved in a direction perpendicular to the first direction.

14. In a telephone system, an automatic switch having a wiper carriage, a pair of movable bars having teeth normally holding said carriage against movement, said teeth having short and long sides, means for moving each bar a distance equal to the short side of a tooth to permit the carriage to move a distance equal to the long side of said tooth, each bar permitting the movement of said carriage in a direction perpendicular to the movement permitted by the other bar.

FRANK A. LUNDQUIST.
JOHN A. KROPP.